United States Patent [19]

Fujii et al.

[11] Patent Number: 6,140,836
[45] Date of Patent: Oct. 31, 2000

[54] SELF-TIMED PIPELINED DATAPATH SYSTEM AND ASYNCHRONOUS SIGNAL CONTROL CIRCUIT

[75] Inventors: Koji Fujii; Takakuni Douseki, both of Tokyo, Japan

[73] Assignee: Nippon Telegraph And Telephone Corporation, Tokyo, Japan

[21] Appl. No.: 09/033,850

[22] Filed: Mar. 3, 1998

[30] Foreign Application Priority Data

Mar. 3, 1997 [JP] Japan .................................... 9-061696

[51] Int. Cl.[7] .................................................. H03K 17/23
[52] U.S. Cl. .............................. 326/35; 326/93; 326/121; 326/112
[58] Field of Search .................................. 326/46, 35, 36, 326/93, 96, 112, 119, 120, 121

[56] References Cited

U.S. PATENT DOCUMENTS

| 5,434,520 | 7/1995 | Yetter et al. ............................ 326/93 |
| 5,486,774 | 1/1996 | Douseki et al. . |
| 5,583,457 | 12/1996 | Horiguchi et al. ....................... 326/121 |
| 5,594,371 | 1/1997 | Douseki ................................... 326/119 |
| 5,929,687 | 7/1999 | Yamauchi ................................ 327/333 |

OTHER PUBLICATIONS

"A Fully Asynchronous Digital Signal Processor Using Self–Timed Circuits" by Gordon M. Jacobs and Robert W. Brodersen, IEEE Journal of Solid–State Circuits, vol. 25, No. pp. 1526–1537, Dec. 6, 1990.

A Comparison of CMOS Implementations of an Asynchronous Circuits Primitive: the C–Element by: Maitham Shams, Jo C. Ebergen, Mohamed I. Elmasry, University of Waterloo, Waterloo, Ontario, Canada, ISLPED 1996 Monterey CA, pp. 1–4.

"A Study on Multi–threshold–voltage COMS Circuit With Asynchronous system", Fujii et al. Proceedings of the 1997 IEICE General Conference Mar. 24–27, 1997, Kansai University, Suita.

*Primary Examiner*—Michael Tokar
*Assistant Examiner*—Don Phu Le
*Attorney, Agent, or Firm*—Norman N. Kunitz; Venable

[57] ABSTRACT

A self-timed pipelined datapath system reduces its power dissipation by accurately controlling the active and inactive states of the multi-threshold CMOS (MT-CMOS) circuit used as its combinational circuit. The MT-CMOS circuit comprises a logic circuit of low-threshold and a power control circuit formed of high-threshold transistors for controlling the power feeding to the logic circuit. The self-timed pipelined datapath system comprises: a pipelined datapath circuit including a plurality of data processing stages, each having a combinational circuit for processing input data and a register connected to the input side of the combinational circuit; and an asynchronous signal control circuit that controls data transmission to and from each of the registers in the pipelined datapath circuit in response to a request signal. The state change of an active state to an inactive state of the combinational circuit is performed in consideration of the signal propagation time therein, whereby the issue of the request signal with respect to the combinational circuit at the preceding stage is delayed from the time the request signal with respect to the current combinational circuit is issued.

11 Claims, 13 Drawing Sheets

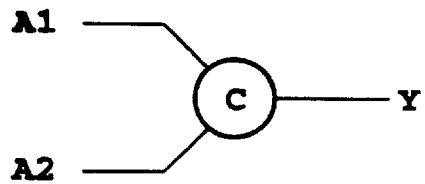
*FIG.11A*
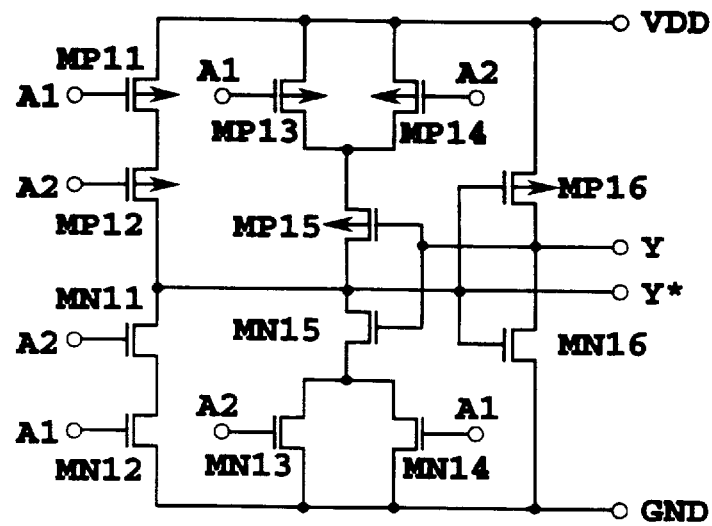
*FIG.11B*
| A1 | A2 | Y |
|---|---|---|
| 0 | 0 | 0 |
| 0 | 1 | Y |
| 1 | 0 | Y |
| 1 | 1 | 1 |
*FIG.11C*

SELF-TIMED PIPELINED DATAPATH SYSTEM AND ASYNCHRONOUS SIGNAL CONTROL CIRCUIT

This application is based on Patent Application No. 61,696/1997 filed Mar. 3, 1997 in Japan, the content of which is incorporated hereinto by reference.

BACKGROUND OF THE INVENTION

1. Field of the Invention

The present invention relates to a technique in which a multi-threshold CMOS circuit (hereinafter referred to just as a "MT-CMOS circuit") is applied to a self-timed pipelined datapath system, wherein the MT-CMOS circuit comprises a logic circuit portion formed by a low-threshold CMOS circuit and a power source control circuit composed of high-threshold MOS transistors for supplying electric power to the logic circuit portion, and more particularly to a technique in which the high-threshold MOS transistors composing the power source control circuit in the MT-CMOS circuit are accurately controlled to be on and off along the data flowing order in response to asynchronous signals, thereby to reduce the power dissipation as a whole.

2. Description of the Prior Art

Recently, in view of a magnification of the information to be transmitted and received by portable communication apparatuses, the LSIs installed on them dissipate more power. To address this problem, various techniques for lowering power dissipation have been researched and developed.

Conventionally, an improvement of operating speed of a circuit at a low supply voltage region has been made by a low-threshold CMOS circuit, and a reduction of leakage current in its inactive state has been progressed by high-threshold MOS transistors, whereby a MT-CMOS circuit as a static CMOS circuit capable of realizing both the high-speed operation and low power dissipation has been proposed (S. Mutoh, T. Douseki, T. Aoki, and J. Yamada, "1V-high-speed digital circuit technology with 0.5É m multi-threshold CMOS", in Proc. IEEE 1993 International ASIC Conf., pp. 186–189,1993. Or, U.S. Pat. No. 5,486,774.)

FIG. 9A shows a configuration of a MT-CMOS circuit. In the figure, reference numeral 1 denotes a logic circuit portion (hereinafter it may be referred to just as "logic circuit") formed by a low-threshold CMOS circuit, to which electric power is supplied from a virtual power rail VDDV and a virtual ground rail GNDV. As shown in FIG. 9A, the logic circuit 1 includes a NAND gate composed of low-threshold pMOS transistors MP1, MP2, low-threshold nMOS transistors MN1 and MN2, and an inverter composed of a low-threshold pMOS transistor MP3 and a low-threshold nMOS transistor MN3. 2H denotes a circuit for controlling the voltage at the virtual power rail, which is composed of high-threshold pMOS transistors MP4 and MP5, whose sources are connected to the power rail VDD, whose drains are connected to the virtual power rail VDDV, and whose gates are connected to a sleep signal SLP, respectively. Further, 2L denotes a circuit for controlling the voltage at the virtual ground rail, which is composed of high-threshold nMOS transistors MN4 and MN5, whose sources are connected to the ground rail GND, whose drains are connected to the virtual ground rail GNDV, and whose gates are connected to an inverted sleep signal SLP* (inverted SLP signal), respectively.

In the MT-CMOS circuit, when the sleep signal SLP is "0", (meaning a low level voltage), and its inverted signal SLP* is "1" (meaning a high level voltage), the high-threshold MOS transistors in the circuit 2H and in the circuit 2L are on, the virtual power rail VDDV and the power rail VDD are thereby electrically connected, and the virtual ground rail GNDV and the ground rail GND are also connected respectively, so that the logic circuit 1 is supplied with power and thereby activated. Conversely, when the sleep signal SLP is "1", and the inverted sleep signal SLP* is "0", the high-threshold MOS transistors in the circuit 2H and the circuit 2L are both off, so that the logic circuit 1 cannot be supplied with electric power, and is put in an inactive state (hereinafter it may referred to just as "sleeping state").

FIG. 9B shows an example of the MT-CMOS circuit, which is equivalent to the MT-CMOS circuit of FIG. 9A but without the circuit 2L, and FIG. 9C shows an example of the MT-CMOS circuit, which is equivalent to the MT-CMOS circuit of FIG. 9A but without the circuit 2H. In the former MT-CMOS circuit, the logic circuit 1 is controlled to be activated or set to the sleeping state only by the sleep signal SLP, whereas in the latter, the logic circuit 1 is controlled only by the inverted sleep signal SLP*.

On an IC chip as shown in FIG. 9D, the MT-CMOS circuit of FIG. 9A is preinstalled in the respective blocks 3 through 6, wherein a circuit block for controlling the power supply 7 generates and sends SLP and/or SLP* signals to each of these blocks 3 through 6 independently. Thus, the activated state and sleeping state of each of the blocks 3 through 6 are controlled independently.

Note that the power source control block 7 may generate only one of the SLP and SLP* signals, and the other signal may be generated within each of the blocks 3 through 6 by way of an inverter. MT-CMOS circuits respectively shown in FIGS. 9B and 9C may be used for the blocks 3 through 6. Further, the SLP and SLP* signals may be supplied externally.

In each block 3 through 6, when the logic circuit 1 is in the sleeping state, the high-threshold MOS transistors in the respective circuit 2H and the circuit 2L are off, the leakage current can be reduced to the level of the high-threshold CMOS circuit, and a reduction of power dissipation is thereby enabled. Further, since the logic circuit 1 is configured by low-threshold MOS transistors only, it performs a high-speed logic operation in its active state even at low supply voltages. In fact, the MT-CMOS circuit features its high-speed operation and its low-level leakage current at low supply voltages. In a conventional CMOS circuit, the leakage current is increased if, for the purpose of accelerating the operating speed thereof, the threshold voltage of the MOS transistors is lowered in compliance with the reduction of the supply voltage, whereas this does not happen to the MT-CMOS circuit.

As mentioned heretofore, it is ensured that the MT-CMOS circuit is effective for reducing the static power dissipation in connection with the low supply voltage. However, basically it is not a circuit for controlling the conductive and/or non-conductive states of the high-threshold MOS transistors therein in accordance with the data flowing order. For this reason, even if it is applied to a pipelined datapath circuit, as long as the high-threshold MOS transistors are on, there still occurs a leakage current even when there is not much data flowing therein, and the static power dissipation is thereby increased.

SUMMARY OF THE INVENTION

The present invention has been achieved to solve the above-described problem and an object of the present invention is to provide a system which controls to make operable only the circuit which is actually in an active state, and reduce the power dissipation in the circuit where no data is being processed when the MT-CMOS circuit is applied to a pipelined datapath circuit.

In order to solve the problems aforementioned, a self-timed pipelined datapath system according to the first embodiment of the present invention is constructed such that it comprises:
a pipelined datapath circuit including a plurality of data processing stages, each having a combinational circuit for processing input data, and a register connected to the input side of the combinational circuit; and an asynchronous signal control circuit that controls data transmission to and from each of the registers in the pipelined datapath circuit in response to a request signal; wherein the combinational circuit in each of the plurality of data processing stages is composed of a multi-threshold CMOS circuit, with the multi-threshold CMOS circuit further comprising, a logic circuit portion configured by a low-threshold CMOS circuit, and a power control circuit portion, which is configured by a plurality of high-threshold MOS transistors and controls power feeding with respect to the logic circuit portion; and wherein the asynchronous signal control circuit comprises a signal generating means for controlling active and inactive states of each of the combinational circuits in response to a request signal.

A self-timed pipelined datapath system according to the second embodiment of the present invention is constructed such that it comprises: a pipelined datapath circuit including a plurality of data processing stages, each having a combinational circuit for processing input data, and a register connected to the input side of the combinational circuit; and an asynchronous signal control circuit that controls data transmission to and from each of the registers in the pipelined datapath circuit in response to a request signal; wherein the combinational circuit in each of the plurality of data processing stages is composed of a multi-threshold CMOS circuit, with the multi-threshold CMOS circuit further comprising, a logic circuit portion configured by a low-threshold CMOS circuit, and a power control circuit portion, which is configured by a plurality of high-threshold MOS transistors and controls power feeding with respect to the logic circuit portion; and wherein the asynchronous signal control circuit comprises: a plurality of monitoring circuits, each of which delays for a predetermined period of time a data write enable signal generated, in response to a request signal, to be applied to the register preceding the current combinational circuit, and issues another request signal with respect to the register succeeding the current combinational circuit, and also finishes the request signal based on the issue of the another request signal; and a plurality of signal generating means each for generating an activation signal for controlling the current combinational circuit to put in an active or inactive state in response to a request signal, but irrespective of an issue of the write enable signal with respect to the register preceding the current combinational circuit.

A self-timed pipelined datapath system according to the third embodiment of the present invention based on a two-phase handshaking protocol is constructed such that it comprises: a pipelined datapath circuit including a plurality of data processing stages, each having, a combinational circuit for processing input data, and a register connected to the input side of the combinational circuit, with the register being composed of a double edge-triggered D flip-flop, and an asynchronous signal control circuit that controls data transmission to and from each of the registers in said pipelined datapath circuit in response to a request signal; wherein the combinational circuit in each of said plurality of data processing stages is composed of a multi-threshold CMOS circuit, with the multi-threshold CMOS circuit further comprising a logic circuit portion configured by a low-threshold CMOS circuit, and a power control circuit portion, which is configured by a plurality of high-threshold MOS transistors and controls power feeding with respect to the logic circuit portion; and wherein the asynchronous signal control circuit comprises: a plurality of delay circuits, each of which delays for a predetermined period of time a state change of a data write enable signal generated, in response to a request signal, to be applied to the register preceding the current combinational circuit, and generates a state change of another request signal with respect to the register succeeding the current combinational circuit; and a plurality of signal generating means each for issuing an activation signal for controlling the current combinational circuit, to put in an active or inactive state, in accordance with the state change of the data write enable signal generated in response to the request signal with respect to the register preceding the current combinational circuit, and finishes said activation signal in response to the state change of the data write enable signal generated in response to the request signal with respect to the register succeeding the current combinational circuit.

As is explained above, since the active and inactive states of the combinational circuits are controlled in accordance with the data flowing order, even in a case that data to be processed are sent intermittently, the static leakage current caused by low-threshold MOS transistors in the active state thereof is reduced, and thereby the power dissipation can be reduced. Further, since only the circuits to be operated are activated, even though a mapping of the active and inactive states in the entire circuit is not planned beforehand at its designing state, effective power dissipation can be performed.

The above and other object, effects, features and advantages of the present invention will become more apparent from the following description of embodiments thereof taken in conjunction with the accompanying drawings.

BRIEF DESCRIPTION OF THE DRAWINGS

FIG. 11A is a symbolic diagram of the C-element, FIG. 11B is a circuit diagram of the C-element, and FIG. 11C is an explanatory view of a truth table of the C-element.

DESCRIPTION OF THE PREFERRED EMBODIMENTS

[First Embodiment]

Figure 1:
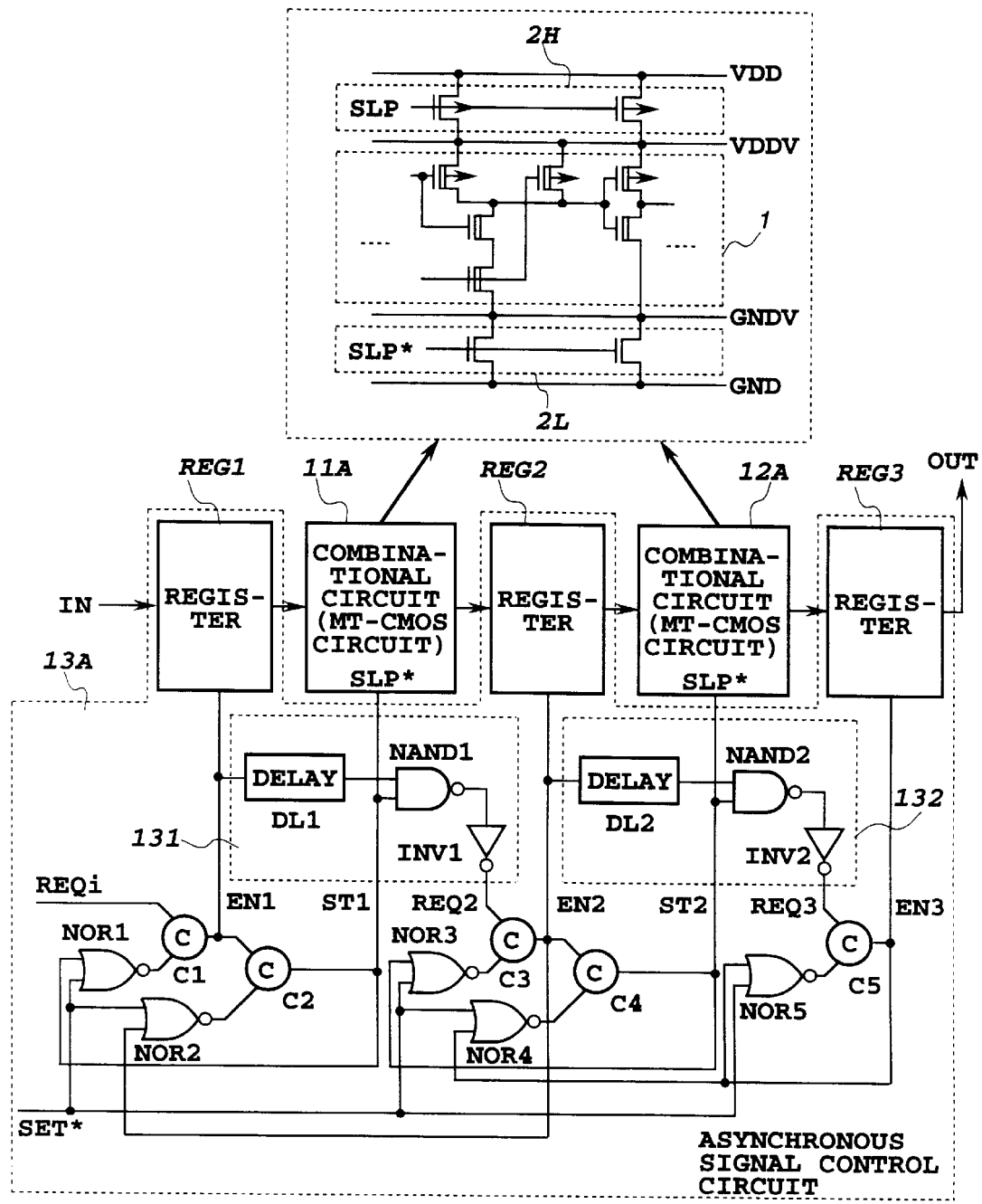
FIG. 1 is a circuit diagram showing a self-timed pipelined datapath system according to a first embodiment of the present invention.

FIG. 1 is a circuit diagram showing a configuration of a self-timed pipelined datapath system according to the first embodiment of the present invention. Reference numerals 11A and 12A denote combinational circuits both adopting the MT-CMOS circuit shown in FIG. 9A, and numeral 13A denotes an asynchronous signal control circuit for controlling the data transmission in the combinational circuits 11A and 12A. Here, a datapath circuit for activating a two-stage pipeline operation is shown as an example. However, the number of stages to be pipelined is not limited to only two.

In the asynchronous signal control circuit 13A, reference characters REQi, REQ2 and REQ3 denote request signals respectively for pipeline control operation, EN1 through EN3 denote data write enable signals to be applied to registers REG1 through REG3 respectively, and ST1 and ST2 denote activation signals respectively for controlling the active and/or inactive (sleeping) states of the combinational circuits 11A and 12A. Here, the signals ST1 and ST2 are inputted to the combinational circuits 11A and 12A respectively as an inverted sleep signal SLP*. The sleep signal SLP is generated by inverting the signal SLP* within the combinational circuits 11A and 12A.

Registers REG1 through REG3 are formed by a series of D flip-flops for storing the data inputted to and/or outputted from the combinational circuits 11A and 12A respectively.

Reference numeral 131 denotes a monitoring circuit for monitoring the operation of the first-stage combinational circuit 11A, which is composed of a delay circuit DL1, a NAND circuit NAND1 and an inverter INV1. By this monitoring circuit, the second request signal REQ2 is issued with respect to the second-stage combinational circuit 12A after the time to be delayed at the delay circuit DL1 has lapsed from the moment that the write enable signal EN1 was issued, in other words, the "0" state thereof was changed to the "1" state. Note that the wording "issue" means a state change of any signal from "0" to "1" throughout the specification. The time to be delayed at the delay circuit DL1 is predetermined in such a manner as to be longer than the propagation delay time within the combinational circuit 11A. The request signal REQ2 finishes in accordance with the completion of the activation signal ST1 (namely that the "1" state of the ST1 signal is changed to the "0" state). Note that the wording "finish" or "completion" means a state change of any signal from "1" to "0" throughout the specification.

Reference numeral 132 denotes a monitoring circuit for monitoring the operation of second-stage combinational circuit 12A, which is composed of a delay circuit DL2, a NAND circuit NAND2 and an inverter INV2, and performs a function just like the first monitoring circuit 131.

Reference characters NOR1 through NOR5 denote NOR gates, and C1 through C5 denote C-elements, each configured as shown in FIG. 11B. Namely, C-elements are respectively composed of pMOS transistors MP11 through MP16, and nMOS transistors MN11 through MN16. Considering the C-element, as shown in the truth table of FIG. 11C, when the two input data A1 and A2 are coincided to be "0", then "0" is outputted as the data Y, while "1" is outputted when coincided to be "1". If they do not coincide, then the previous data is maintained to be outputted.

It is to be noted that the C-element is disclosed in the following documents; G. M. Jacob et al. "A Fully Asynchronous Digital Signal Processor Using Self-Timed Circuits" IEEE Journal on Solid State Circuits, vol. 25, No. 6, December 1990, pp. 1526–1537; and M. Shames et al. "A Comparison of CMOS Implementations of an Asynchronous Circuits Primitive: the C-element" International Symposium on Low Power Electron Devices Monterey Calif. 1996, pp. 93–96.

Figure 10:
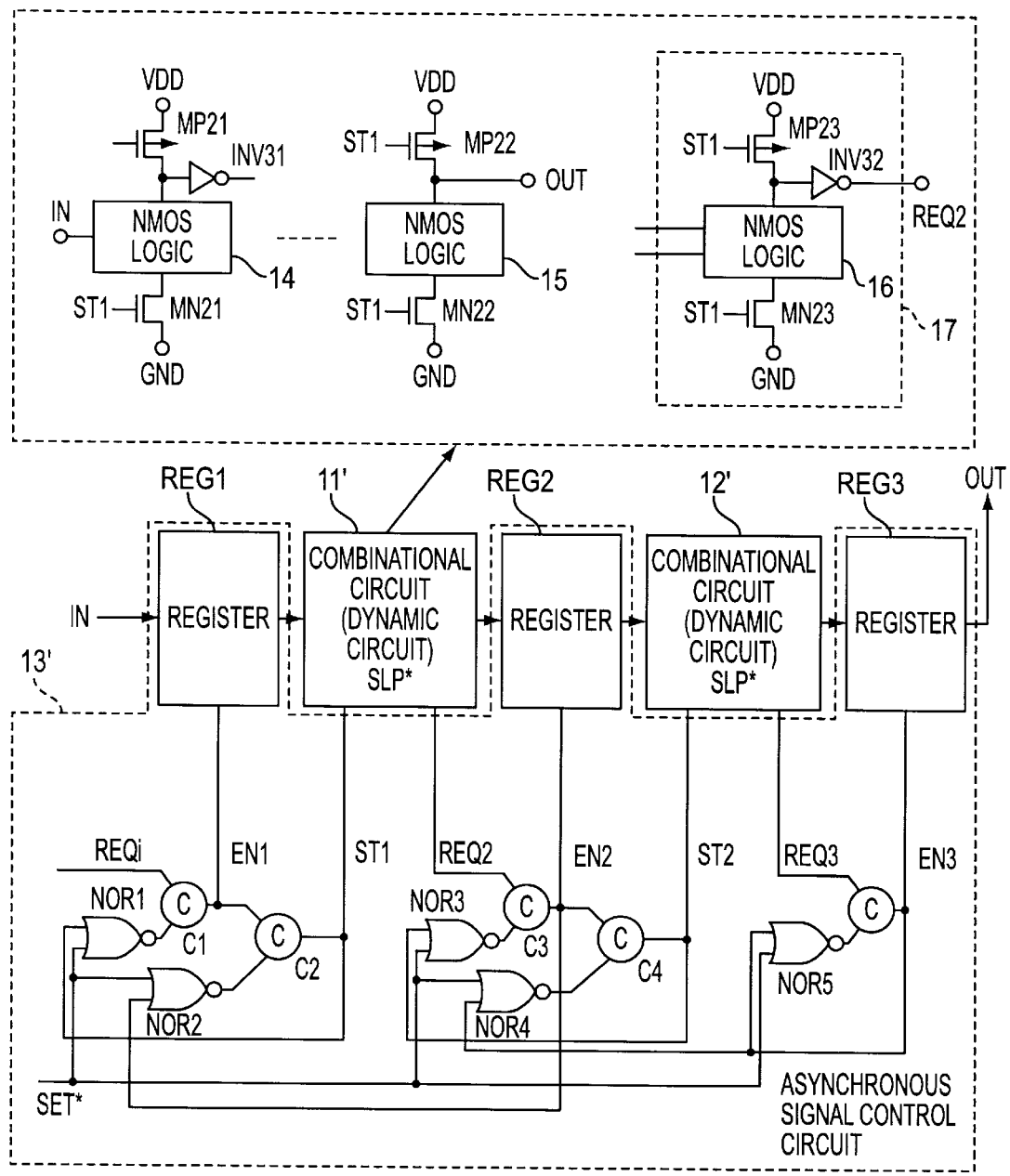
FIG. 10 is a circuit diagram showing a self-timed pipelined datapath system using a dynamic logic circuit therein as a combinational circuit.

Here, in order to facilitate the understanding of the present embodiment, a conventionally disclosed self-timed pipelined datapath system is explained, taking up the case shown in FIG. 10 in which dynamic combinational circuits 11' and 12' are adopted. In the same figure, reference numeral 13' is an asynchronous signal control circuit. The members same as those in FIG. 1 have the same numbers.

In the dynamic combinational circuit 11' (and also to the combinational circuit 12'), MP21 through MP23 are pMOS transistors for a precharging operation, MN21 through MN23 are nMOS transistors for a discharging operation, INV31 and INV32 are inverters, and reference numerals 14 through 16 are pull-down networks each composed of nMOS transistors. The dynamic combinational circuit 11' is formed by a DOMINO logic circuit, and includes a monitoring circuit 17 for monitoring the completion of the combinational circuit 11' itself. Since the transistors MP21 through MP23 are on when the activation signal ST1 is "0", and the dynamic circuit is put in a precharging state, so that the request signal REQ2 outputted from this monitoring circuit 17 is turned to "0".

On the other hand, when the activation signal ST1 becomes "1", and the transistors MN21 through MN23 are on to start logic operation (sampling operation), the request signal REQ2 is turned to "1" after a predetermined time lapse. The timing for converting the request signal REQ2 into "1" is determined in such a manner that the logic circuit 16 in the monitoring circuit 17 raises a signal to flag the completion of logic operation in the combinational circuit 11'.

In this manner, the request signal REQ2 with respect to the succeeding combinational circuit 12' is issued after a predetermined time lapse corresponding to the propagation delay time of the current combinational circuit 11' from the issue of the activation signal ST1, and finishes in accordance with the completion of the activation signal ST1.

In the first embodiment of the present invention, a monitoring circuit 131 is provided as shown in FIG. 1, so as to readily generate the request signal REQ2 that satisfies the above condition. In the same manner, the monitoring circuit 132 is provided for generating the request signal REQ3.

Figure 2:
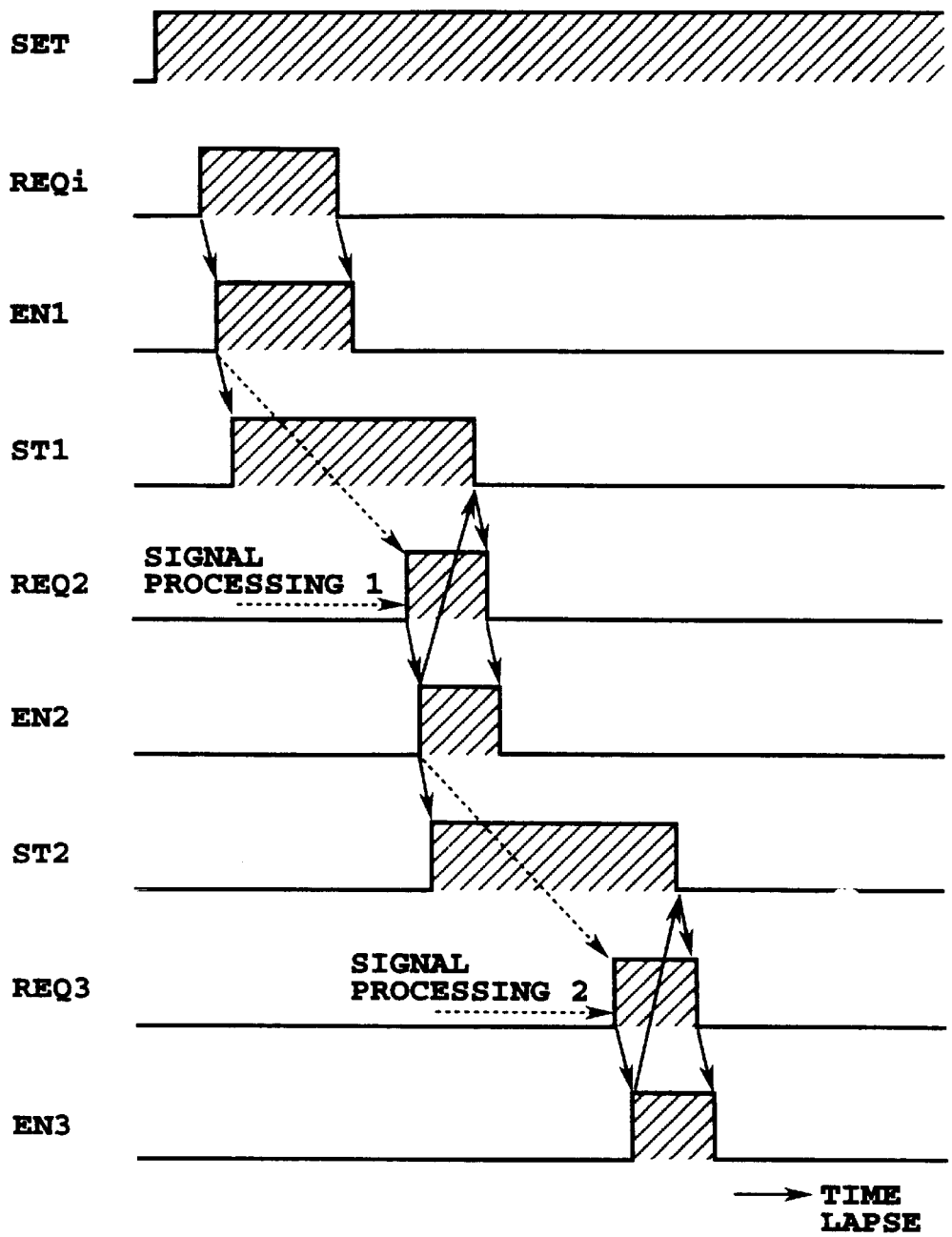
FIG. 2 is a timing chart for the operation of an asynchronous signal control circuit of FIG. 1.

The operation of this embodiment is now explained referring to FIG. 2.

First, a SET signal is issued to put the asynchronous signal control circuit 13A in an active state. Then, in a state that all the data to be inputted to the register REG1 are ready, a request signal REQ1 is issued from outside. As the result, a write enable signal EN1 to be applied to the first-stage register (hereinafter it may be referred to just as "first register") REG1, and an activation signal ST1 with respect to the first-stage combinational circuit (hereinafter it may referred to just as "first combinational circuit") 11A are issued one after the other. Further, when the activation signal ST1 is issued, the first combinational circuit 11A is put in an active state (meaning that the signal SLP is set to "0", and the signal SLP* is set to "1", and a logic processing operation is performed to the data received from the first register REG1.

Next, when a period of time which is longer than the propagation delay time in the first combinational circuit 11A has passed after the moment that the activation signal ST1 was issued, the monitoring circuit 131 issues a request signal REQ2 with respect to the second combinational circuit 12A.

In accordance with the issue of the request signal REQ2, a write enable signal EN2 to be applied to the second-stage register (hereinafter it may be referred to just as "second register") REG2, and an activation signal ST2 to be applied to the second-stage combinational circuit (hereinafter referred to just as "second combinational circuit") 12A are issued one after the other. Thereafter, due to the fact that the write enable signal EN2 has been issued, the data processed in the first combinational circuit 11A is stored in the second register REG2, and the activation signal ST1 to be applied to the first combinational circuit 11A finishes, and thereafter the second request signal REQ2 with respect to the second combinational circuit 12A also finishes. Due to the completion of the request signal REQ2, the write enable signal EN2 is also completed.

Here, due to the completion of the activation signal ST1, the signal SLP to the first combinational circuit 11A is set to "1", and the signal SLP* is set to "0", so that the combinational circuit 11A is put in an inactive state. On the other hand, because of the issue of the activation signal ST2, the signal SLP to the second combinational circuit 12A is set to "0", and the signal SLP* is set to "1", so that the combinational circuit 12A is put in an active state, so as to process the data outputted from the second register REG2. In other words, an active state is shifted from the first combinational circuit 11A to the second combinational circuit 12A.

Next, when a period of time which is longer than the propagation delay time in the second combinational circuit 12A has passed after the moment that the activation signal ST2 was issued, the monitoring circuit 132 issues a request signal REQ3 with respect to the third-stage register (hereinafter it may referred to just as "third register") REG3. In accordance with the issue of the request signal REQ3, a write enable signal EN3 to be applied to the third-stage register REG3 (hereinafter it may be referred to just as "third register) is issued, and the data processed in the second combinational circuit 12A is stored in the third register REG3. Further, due to the issue of the write enable signal EN3, the activation signal ST2 to be applied to the second combinational circuit 12A finishes, so that the second combinational circuit 12A is put in an inactive state, and thereafter the request signal REQ3 with respect to the third register REG3 also finishes. Due to the completion of the request signal REQ3, the write enable signal EN3 is also completed.

In this way, in accordance with the completion of the request signal REQ3, a series of pipelining operation is completed. Note that after the completion of the request signal REQi from outside, the asynchronous signal control circuit is put in a waiting state for another request signal.

As explained heretofore, the combinational circuits 11A and 12A are activated only when the respective registers thereof receive data and the data are need to be processed. Otherwise, they are put in an inactive state. In the inactive state, a static leakage current is suppressed by the circuits for controlling power supply 2H and 2L, which are composed of high-threshold MOS transistors in the MT-CMOS circuits of the respective combinational circuits 11A and 12A. For this reason, power dissipation in the pipelined circuit for processing intermittently received data is greatly reduced.

Figure 3:
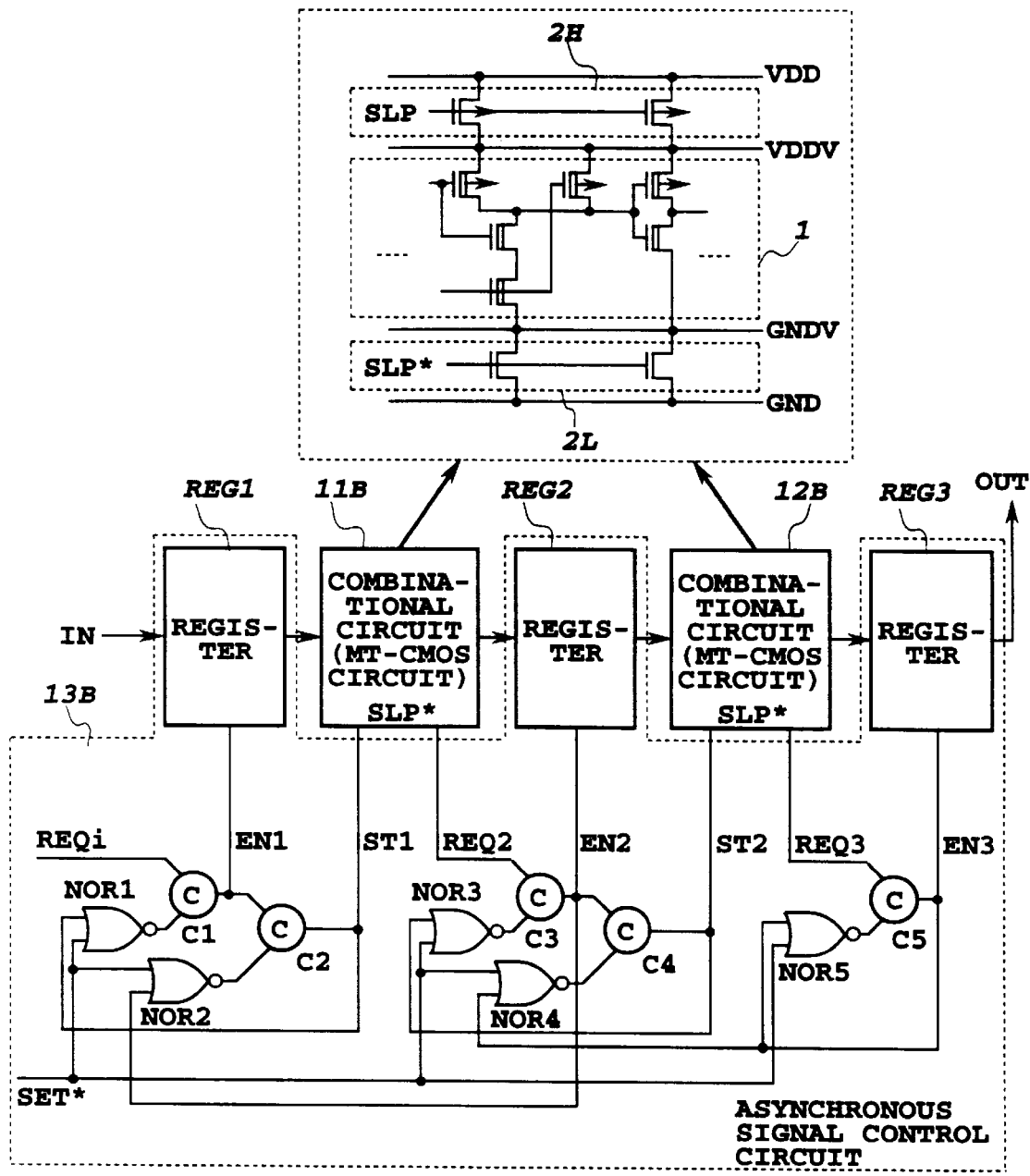
FIG. 3 is a circuit diagram showing a modification of the self-timed pipelined datapath system of the first embodiment.

FIG. 3 shows a modified embodiment of the above-explained configuration. The pipelined datapath circuit of this type adopts an asynchronous signal control circuit 13B (same as the asynchronous signal control circuit 13' in FIG. 10), wherein monitoring circuits (not shown) equivalent to the circuits 131 and 132 disclosed in FIG. 1 are preinstalled within the combinational circuits 11B and 12B.

In this configuration, write enable signals EN1 through EN3 with respect to the registers REG1 through REG3 are inputted to the monitoring circuits inside the combinational circuits 11B and 12B by way of the registers REG1 through REG3, and request signals REQ2 and REQ3 are thereby issued. These request signals REQ2 and REQ3 finish in accordance with the completion of the activation signals ST1 and ST2 respectively.

[Second embodiment]

Figure 4:
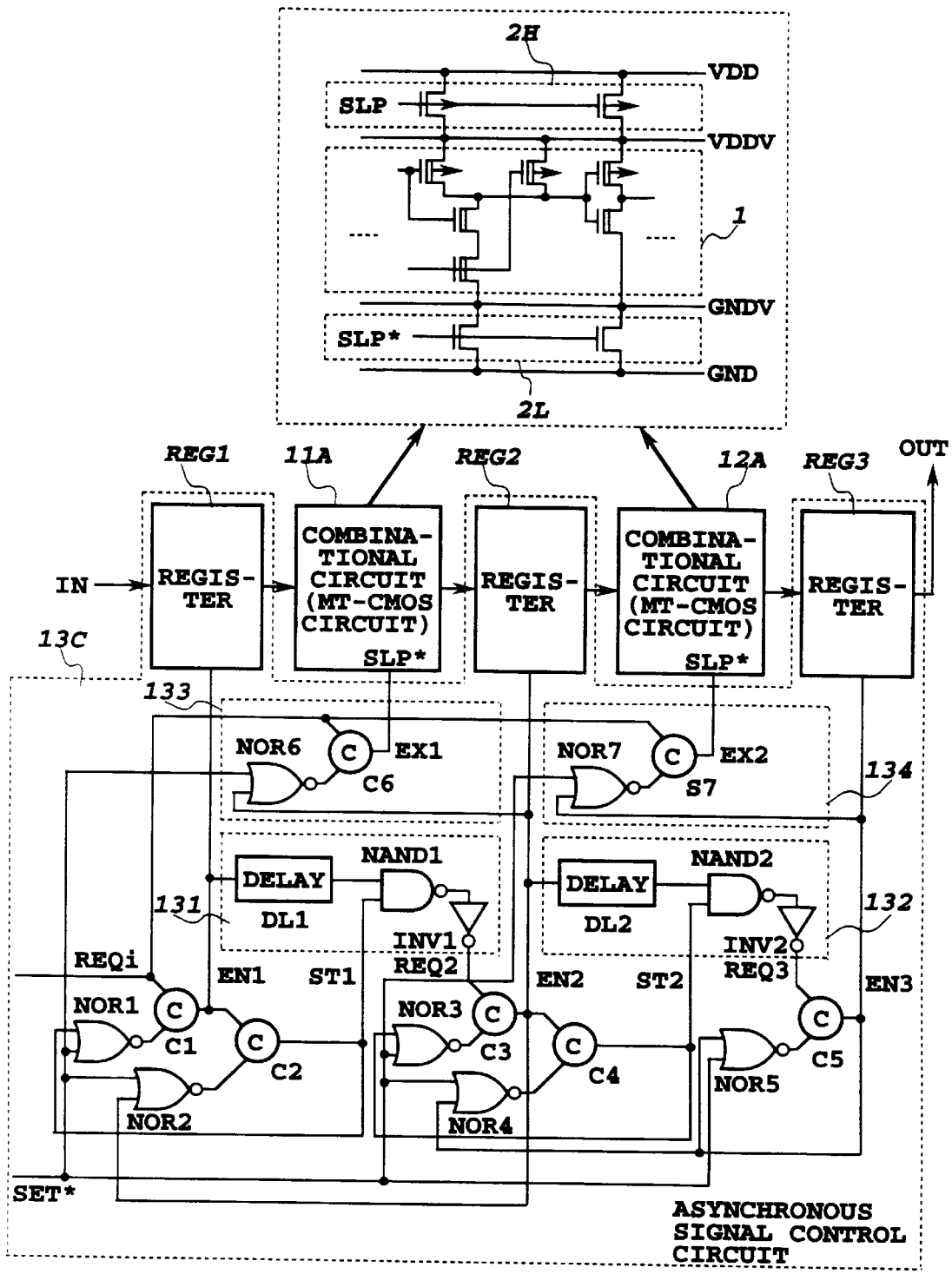
FIG. 4 is a circuit diagram showing a self-timed pipelined datapath system according to a second embodiment of the present invention.

FIG. 4 shows a configuration of the self-timed pipelined datapath system according to a second embodiment of the present invention. The same members as those in FIG. 1 have the same reference numbers. Reference numeral 13C denotes an asynchronous signal control circuit, wherein an activation-signal-generating circuit 133 formed by a NOR gate NOR6 and a C-element C6, and an activation-signal-generating circuit 134 formed by a NOR gate NOR7 and a C-element C7 are further provided in addition to the asynchronous signal control circuit 13A of FIG. 1.

The activation-signal-generating circuit 133 takes in the request signal REQi and SET* signal, and issues therein an activation signal EX1 with respect to the first combinational circuit 11A. The other signal generating circuit 134 also takes in the request signal REQi and the SET* signal, and issues an activation signal EX2 with respect to the second combinational circuit 12A. However, the completion of the activation signal EX2 is performed after the issue of the write enable signal EN3. In other words, the activation-signal-generating circuits 133 and 134 issue the respective activation signals at the same time.

Here, since a dynamic circuit is adopted for each of the combinational circuits 11' and 12', as shown in FIG. 10, in the self-timed pipelined datapath system, its logic operation needs to be performed after the data to be inputted to these circuits 11' and 12' are ready. For this reason, the activation signal ST1 is an output of the C-element C2 to which the write enable signal EN1 is inputted, whereas the activation signal ST2 is an output of the C-element C4 to which the write enable signal EN2 is inputted.

However, since a static circuit is adopted for the combinational circuits 11A and 12A in the present embodiment, the issuing order between the signals EN1 and ST1, and that between the signals EN2 and ST2 can be disregarded. On the contrary, in the MT-CMOS circuits adopted for the combinational circuits 11A and 12A of the present embodiment, it takes substantial time to raise the voltage at the virtual power rail VDDV and/or to lower the voltage at the virtual ground rail GNDV from the moment that the high-threshold MOS transistors configuring the circuits 2H and 2L are on. For this reason, it is preferable that the high-threshold MOS transistors of the circuits 2H and 2L are on in advance before arrival of the data. In other words, it is preferable that the activation signal EX2 for the succeeding-stage combinational circuit 12A is already issued in advance at the moment of arrival of the data to the preceding-stage combinational circuit 11A, and that the activation signal EX2 finishes in accordance with the issue of the write enable signal EN3 to be applied to the third register REG3.

For this reason, in order to meet the above requirements, the activation-signal-generating circuits 133 and 134 are provided for generating the activation signals EX1 and EX2 in this second embodiment. As the result, under the condition that the SET signal has been issued, the activation signal EX2 to be fed to the second combinational circuit 12A is issued at the same time with the issue of the request signal REQi, and it finishes at the issue of the write enable signal EN2. It is to be noted that the activation signal EX1 to be fed to the first combinational circuit 11A is issued at the same time with the issue of the request signal REQi, and it finishes at the issue of the write enable signal EN2. In this way, an adverse effect generally caused by a time-consuming activating operation can be mitigated by putting in advance the second combinational circuit 12A in an active state.

Figure 5:
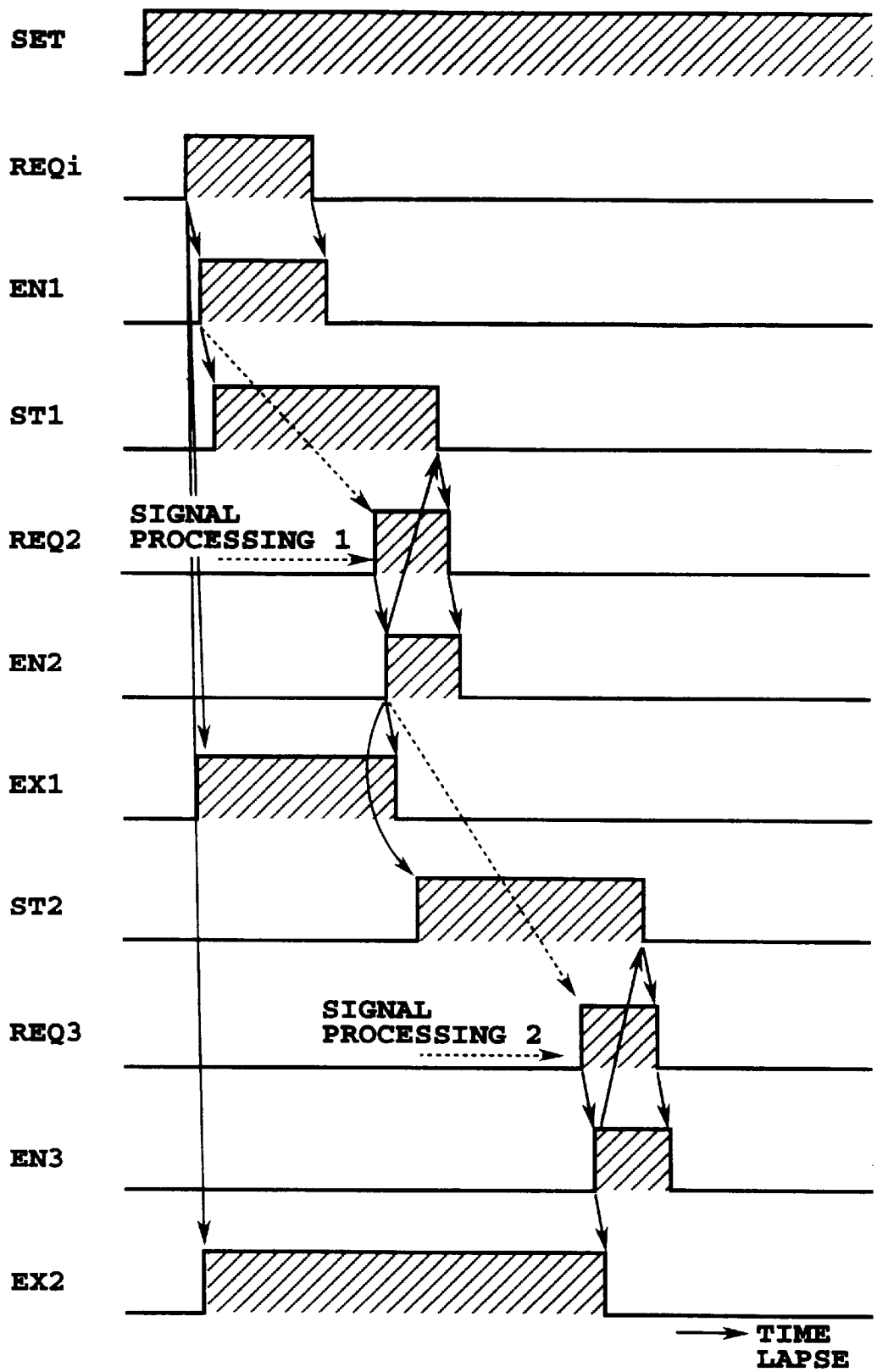
FIG. 5 is timing chart for the operation of the asynchronous signal control circuit of FIG. 4.

The operation of this embodiment is now explained referring to FIG. 5.

First, the SET signal is issued to put the asynchronous signal control circuit 13C in an active state. Then, in a state that all the data to be inputted to the register REG1 are ready, the request signal REQi is issued from outside. As the result, the write enable signal EN1 with respect to the first register REG1, the activation signal EX1 with respect to the first combinational circuit 11A, and the activation signal EX2 with respect to the second combinational circuit 12A are issued one after another. This way, the inputted data is stored in the first register REG1 by the write enable signal EN1. Further, when the activation signal EX1 is issued, the first combinational circuit 11A is put in an active state, and a logic processing operation is performed to the data inputted from the first register REG1. Further, the second combinational circuit 12A is also put in an active state in advance due to the issue of the activation signal EX2.

Next, when a period of time which is longer than the propagation delay time in the first combinational circuit 11A has passed after the moment that the activation signal EX1 was issued, the monitoring circuit 131 issues a request signal REQ2 with respect to the second combinational circuit 12A.

In accordance with the issue of the request signal REQ2, the write enable signal EN2 to be applied to the second register is issued. Due to the fact that the write enable signal EN2 has been issued, the data processed in the first combinational circuit 11A is stored in the second register REG2, and activation signal ST1 which has been used for the monitoring circuit 131 finishes. Due to the completion of the activation signal ST1, the request signal REQ2 with respect to the second combinational circuit 12A finishes, and the write enable signal EN2 to be applied to the second register REG2 is also completed.

Here, due to the completion of the activation signal EX1, the combinational circuit 11A is put in an inactive state. On the other hand, because the combinational circuit 12A has already been put in an active state at the same time with the activation of the first combinational circuit 11A, the data outputted from the second register REG2 is processed.

Next, when a period of time which is longer than the propagation delay time in the second combinational circuit 12A has passed after the moment that the write enable signal EN2 to be applied to the second register REG2 was issued, the monitoring circuit 132 issues the request signal REQ3 with respect to the third register REG3. In accordance with this issue of the request signal REQ3, the data processed in the second combinational circuit 12A is stored in the register REG3 by the issue of write enable signal EN3, and further, the activation signal EX2 with respect to the second combinational circuit 12A finishes, whereby the second combinational circuit 12A is put in an inactive state. Thereafter, the activation signal ST2 fed to the monitoring circuit 132 finishes, and the request signal REQ3 with respect to the third register REG3 also finishes. Due to the completion of the request signal REQ3, the write enable signal EN3 is also completed.

Note that after the completion of the request signal REQi from outside, the asynchronous signal control circuit is again put in a waiting state for another request signal.

In this embodiment above as well, the combinational circuit 11A is activated only when the data are ready to be fed thereto, and the combinational circuit 12A is activated also only when the data are ready to be fed to the preceding combinational circuit 11A, whereas they are in the inactive state when there are no data ready. For this reason, the power dissipation generally caused during the processing operation of the intermittently inputted data in the pipelined datapath circuit can be greatly reduced. In addition to this, since the second combinational circuit 12A is activated before the data to be processed therein are received, this alleviates a speed loss caused by the slow transition from the inactive to active state or vice versa regarding the combinational circuit.

[Third embodiment]

Figure 6:
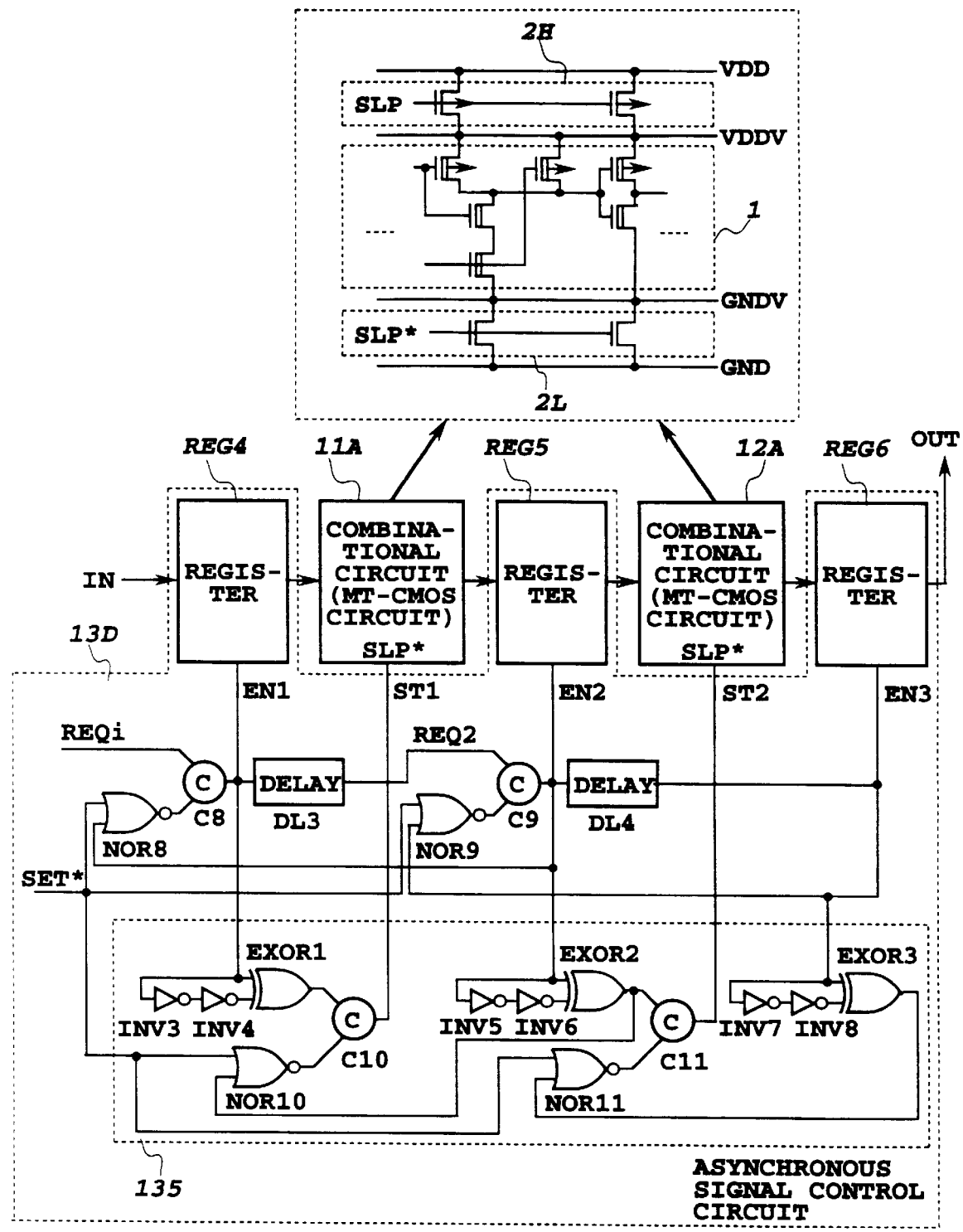
FIG. 6 is a circuit diagram showing a self-timed pipelined datapath system according to a third embodiment of the present invention.

FIG. 6 shows a configuration of the self-timed pipelined datapath system according to the third embodiment of the present invention. Although the datapath shown in this embodiment is a circuit in which two-stage pipelined operation adopting a two-phase handshaking protocol is performed, the number of stages is not limited to this. Note that same members as those in FIG. 1 have the same reference numbers. Reference numeral 13D denotes an asynchronous signal control circuit.

In this asynchronous signal control circuit 13D, REG4 through REG6 are registers configured by a series of double edge-triggered D flip-flops for storing the data inputted to and/or outputted from the combinational circuit 11A and 12A. The D flip-flop latches data both at the rising and falling edges of the clock signal.

Figure 8:
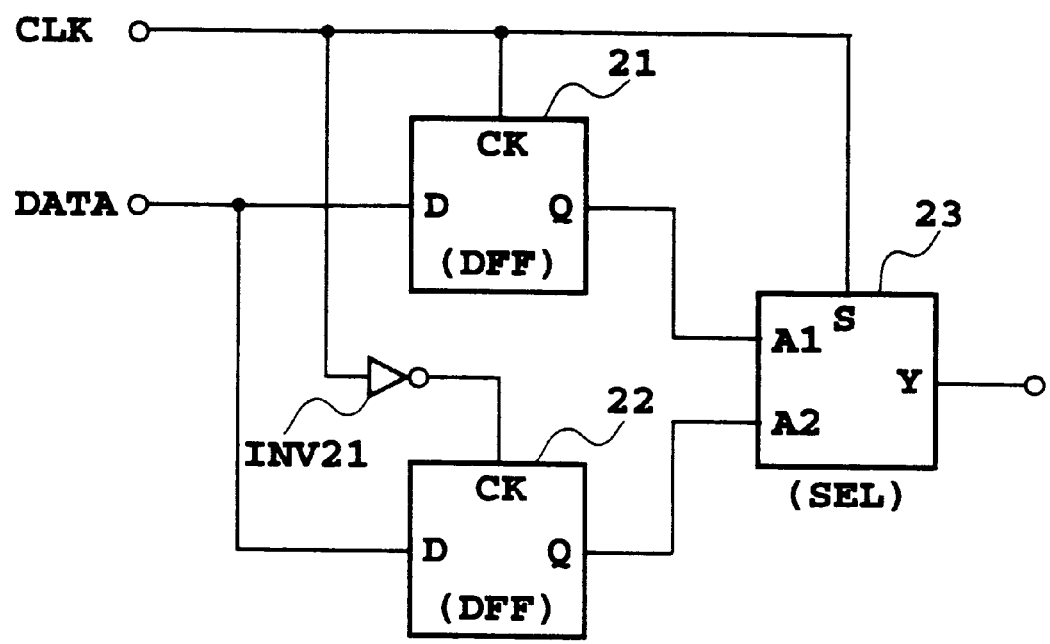
FIG. 8 is a circuit diagram showing a double edge-triggered flip-flop.

FIG. 8 shows an example of the configuration thereof. Reference numerals 21 and 22 denote respectively D flip-flops for latching the data inputted to the terminal D at the rising edge of the clock signal CLK. In the figure, numeral 23 denotes a selector that selects the outputted data from the flip-flop 21 when the clock signal is "1", whereas it selects the other outputted data from the flip-flop 22 when the clock signal is "0". INV 21 denotes an inverter.

In this circuit above, the data inputted to the flip-flop 21 is latched at the rising edge of the clock signal CLK, and is selected at the selector 23 during the period in which the clock signal is "1" to be outputted therefrom. On the other hand, the data inputted to the flip-flop 22 is latched at the falling edge of the clock signal CLK, and is selected at the selector 23 during the period in which the clock signal is "0" to be outputted therefrom.

Referring back to FIG. 6, reference characters DL3 and DL4 denote delay circuits, in which the delay time is set in such a way as to be longer than the propagation delay time in each of the combinational circuits 11A and 12A. Reference characters C8 through C11 denote C-elements, NOR8 through NOR11 denote NOR gates, EXOR1 through EXOR3 denote exclusive OR gates and INV3 through INV8 denote inverters.

Figure 12:
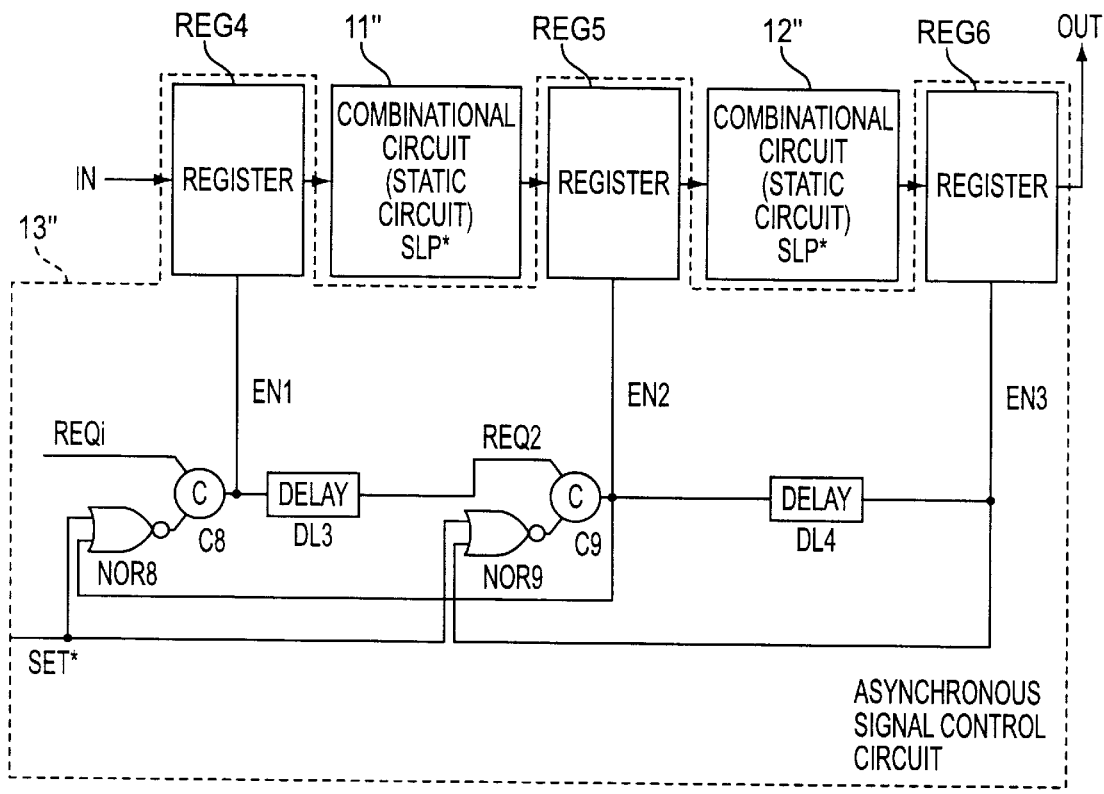
FIG. 12 is a circuit diagram showing a self-timed pipelined datapath system based on the two-phase handshaking protocol using s static circuit as the combinational circuit.

Here, in order to facilitate the understanding of the present embodiment, a conventionally disclosed self-timed pipelined datapath system adopting a two-phase handshaking protocol is explained, taking up the case in which static combinational circuits 11" and 12" are used as shown in FIG. 12. In FIG. 12, reference numeral 13" is an asynchronous signal control circuit, and the members same as those in FIG. 6 have the same numbers. There are no activation signals provided for neither of the combinational circuits 11", 12" from the asynchronous circuit 13".

In the two-phase handshaking protocol, any state change of the asynchronous signal is regarded as being the progress of an event, and the data processing is performed. Namely, the state change from "0" to "1" (meaning an issue) is regarded as being the same as the state change from "1" to "0" (meaning a completion), so that the level itself of the asynchronous signal has nothing to do with the progress of the event.

In such a simple asynchronous system, the combinational circuit 11" is always set in an active state, wherein in order to adjust the timing of the completion of the data process within the combinational circuit 11" and that of the state change of the asynchronous signal, the write enable signal EN1 to be applied to the first-stage register REG4 is inputted to the delay circuit DL3, and the write enable signal EN2 to the second-stage register REG5 is then generated by the delay circuit DL3. The timing adjustment between the completion of the data process within the second combinational circuit 12" and that of the state change of the asynchronous signal is also performed in the same way.

However, in this embodiment, it is required to control the combinational circuits 11A and 12A respectively composed of the MT-CMOS circuit so as to put the circuits in the active or inactive state continuously. For this reason, in this embodiment, an activation-signal-generating circuit 135 is added in order to detect the state change of the asynchronous signal and generate activation signals ST1 and ST2.

In this activation signal generating circuit 135, the state change of the write enable signal EN1 to the first register REG4 is detected as a signal pulse "1" by a delay circuit formed by two inverters INV3 and INV4, and an exclusive OR gate EXOR1. Further, the state change of the write enable signal EN2 to the second register REG5 is also detected as a signal pulse "1" by a delay circuit formed by two inverters INV5 and INV6, and an exclusive OR gate EXOR2. Still further, the state change of the write enable signal EN3 to the third register REG6 is also detected as a signal pulse "1" by a delay circuit formed by two inverters INV7 and INV8, and an exclusive OR gate EXOR3.

When there is no occurrence of the state change in the write enable signal EN1, the output of the exclusive OR gate EXOR1 is "0", and that of the NOR gate NOR10 is "1" (since the SET signal is "1" (in other words, the SET* signal in FIG. 6 is "0") and the output of the exclusive OR gate EXOR2 is "0"), so that the output of the C-element C10 is held unchanged.

In this state above, when the write enable signal EN1 is issued, the output signal of the exclusive OR gate EXOR1 is changed to "1" temporally, the output of the C-element C10 becomes "1", and the activation signal ST1 is issued. Thereafter, although the output of the exclusive OR gate EXOR1 is immediately returned to "0", as the output "1" of the NOR gate NOR10 is held unchanged, the output of the C-element C10; namely the activation signal ST1 maintains the prior state "1" thereof. After this operation, due to the issue of the write enable signal EN2, the output of the exclusive OR gate EXOR2 is changed temporally to "1", and the output of the NOR gate NOR10 is changed to "0", so that the output of the C-element C10, namely the activation signal ST1, becomes "0", which means the completion thereof. All these operations are equally performed to the other activation signal ST2 as well.

As explained heretofore, by the function of the activation-signal-generating circuit 135, during the period from the issue of the activation signal ST1 to the issue of the write enable signal EN2, the activation signal ST1 is maintained to "1". Further, during the period from the issue of the activation signal ST2 to the issue of the write enable signal EN3, the activation signal ST2 is maintained to "1". All these operations can be observed in the case that the request signal REQi is issued. However, the same operation can be observed even when the REQi is completed, since the signal REQi changes its state thereby.

Figure 7:
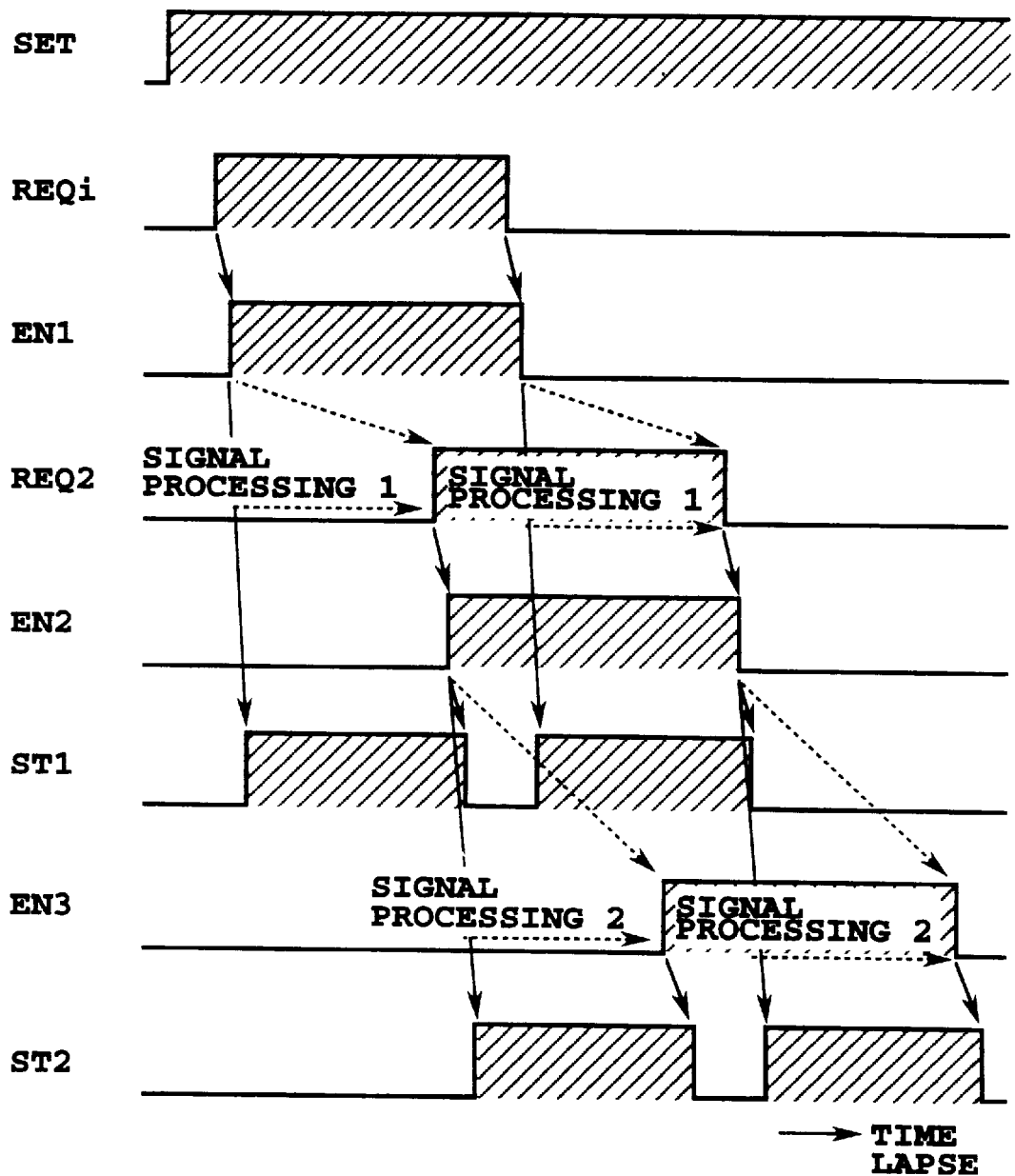
FIG. 7 is a timing chart for the operation of the asynchronous signal control circuit of FIG. 6.

The operation of this embodiment is now explained referring to FIG. 7.

First, the SET signal is issued to set the asynchronous signal control circuit 13D in an active state. Then, in a state that all the data to be inputted to the first register REG4 are ready, a request signal REQi is issued from outside. As the result, the write enable signal EN1, and the activation signal ST1 are issued one after the other. Thereafter, the inputted data is stored in the first register REG4 due to the issue of the write enable signal EN1. Further, due to the issue of the activation signal ST1, the first combinational circuit 11A is put in an active state, and executes a logic processing operation to the data inputted thereto from the first register REG4.

Next, when a period of time which is longer than the propagation delay time in the first combinational circuit 11A has passed after the moment that the activation signal ST1 was issued, the request signal REQ2 is issued by the delay circuit DEL3, and the write enable signal EN2 and the activation signal ST2 are thereby issued. Due to the fact that the write enable signal EN2 has been issued, the data processed in the first combinational circuit 11A is stored in the second register REG5, and the activation signal ST1 is completed, whereby the first combinational circuit 11A is put in an inactive state. Thereafter, following to the issue of the activation signal ST2, the combinational circuit 12A executes a logic processing operation with respect to the data outputted from the first register REG5.

Next, when a period of time which is longer than the propagation delay time in the second combinational circuit 12A has passed after the moment that the write enable signal EN2 is issued, the write enable signal EN3 is issued by the delay circuit DEL4. Due to the issue of this write enable signal EN3, the data processed in the second combinational circuit 12A is stored in the third register REG6, and further, the activation signal ST2 to be applied to the combinational circuit 12A finishes, so that the circuit 12A is put in an inactive state.

Note that if the request signal REQi is completed during the period that the write enable signal EN2 is in the "1" state, the both inputs to the C-element C8 become "0". By this function, the write enable signal EN1 as an output from C-element C8 is completed, and the same similar operation to the above is performed.

As shown above, the pipelining operation in the present embodiment is performed in response to the issue of the request signal REQi, as well as to the completion of the REQi signal. In this case, the combinational circuits 11A and 12A are activated only when the data are ready to be inputted to the registers respectively connected to each of the input side thereof, and need to be processed therein, whereas they are put in an inactive state when no data processing is needed. For this reason, the power dissipation of the pipelined datapath circuit, in which the intermittently inputted data are processed, can be reduced.

[Other modifications]

Figure 9A:
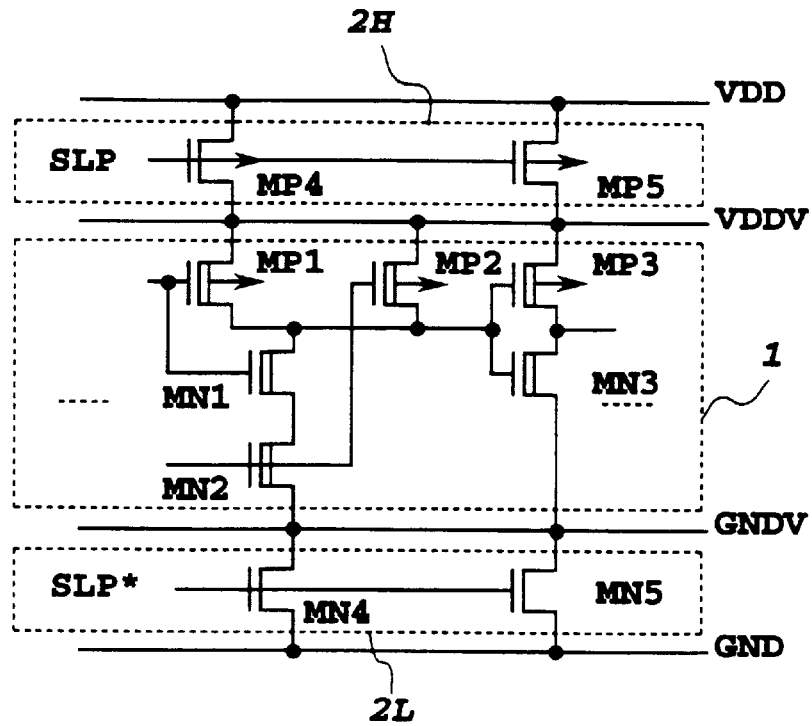
FIGS. 9A through 9C are circuit diagrams respectively showing the MT-CMOS circuit.
Figure 9B:
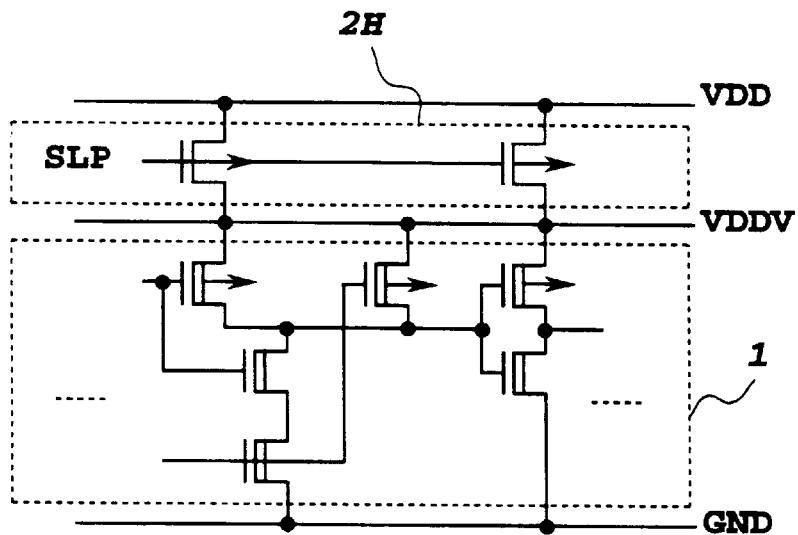
Figure 9C:
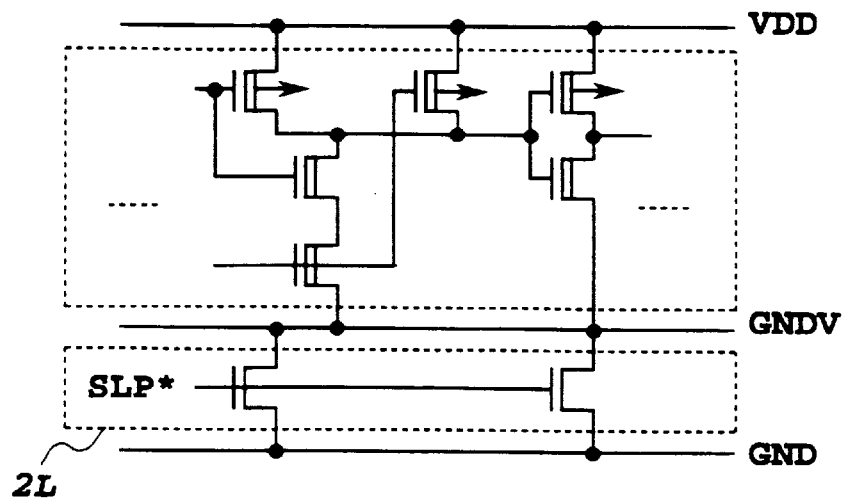
Figure 9D:
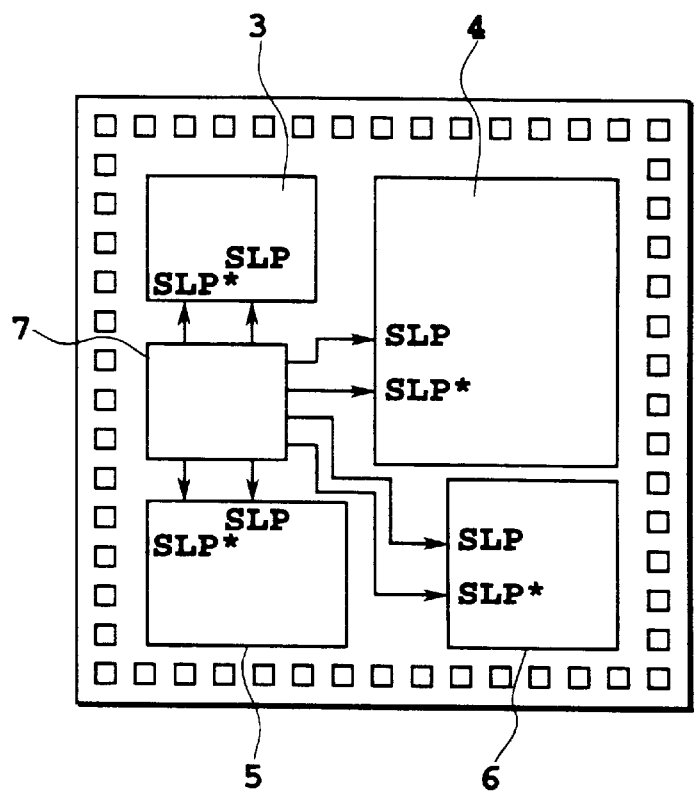
FIG. 9D is an explanatory view of a case in which the MT-CMOS circuit is preinstalled in an IC.

In the first through third embodiments, the combinational circuits 11A, 12A, 11B and 12B are provided, as shown in FIG. 9A, with the circuit 2H, which controls the voltage at the virtual supply rail and the circuit 2L, which controls the voltage at the virtual ground rail as the MT-CMOS circuits to be used therein. However, MT-CMOS circuits provided, as shown in FIG. 9B, only with the circuit 2H, or MT-CMOS circuits provided, as shown in FIG. 9C, only with the circuit 2L, can also be used as a matter of fact. Specially in the case shown in FIG. 9C, it is not required to generate any sleeping signal SLP within the circuits, whereby a number of required elements to be used can be reduced.

Furthermore, in the first through third embodiments above, if the asynchronous signal control circuits 13A, 13B, 13C and 13D are formed by high-threshold MOS transistors similar to the high-threshold transistors inside the MT-CMOS circuits composing the combinational circuits 11A and 12A, the static power dissipation therein can be reduced. These asynchronous signal control circuits 13A through 13D are not expected to operate at such a high speed as the combinational circuits 11A, 12A, 11B and 12B, so that the decrease in the operating speed caused by the use of high-threshold MOS transistors will little affect the speed performance as a whole.

The present invention has been described in detail with respect to preferred embodiments, and it will now be apparent from the foregoing to those skilled in the art that changes and modifications may be made without departing from the invention in its broader aspect, and it is the invention, therefore, in the apparent claims to cover all such changes and modifications as fall within the true sprit of the invention.

What is claimed is:

1. A self-timed pipelined datapath system comprising:
   a pipelined datapath circuit including a plurality of data processing stages, each having a combinational circuit for processing input data, and a register connected to the input side of said combinational circuit; and an asynchronous signal control circuit that controls data transmission to and from each of the registers in said pipelined datapath circuit in response to a request signal;
   wherein said combinational circuit in each of said plurality of data processing stages is composed of a multi-threshold CMOS circuit, with said multi-threshold CMOS circuit further comprising
   a logic circuit portion configured by a plurality of low-threshold CMOS circuits, and
   a power control circuit portion, which is configured by a plurality of high-threshold MOS transistors and controls power feeding with respect to said logic circuit portion; and wherein said asynchronous signal control circuit comprises:
   a signal generating means for controlling active and inactive states of each of said combinational circuits in response to a request signal,
   and a plurality of monitoring circuits, each of which delays a write enable signal generated, in response to a request signal, to be applied to the register preceding the current combinational circuit, and issues another request signal with respect to the register succeeding the current combinational circuit.

2. A self-timed pipelined datapath system as claimed in claim 1, wherein said asynchronous signal control circuit comprises a plurality of high-threshold MOS transistors.

3. A self-timed pipelined datapath system as claimed in claim 1, wherein said asynchronous signal control circuit generates said activation signal with respect to a current combinational circuit from a write enable signal generated, in response to a request signal, to be applied to the register preceding the current combinational circuit and another write enable signal generated, in response to another request signal, to be applied to the register succeeding the current combinational circuit.

4. A self-timed pipelined datapath system as claimed in claim 3, wherein said request signal with respect to the register succeeding the current combinational circuit is arranged to be generated after a signal propagation time within the current combinational circuit has passed from the moment of generation of the write enable signal in response to the request signal with respect to the register preceding the current combinational circuit.

5. A self-timed pipelined datapath system comprising: a pipelined datapath circuit including a plurality of data processing stages, each having
   a combinational circuit for processing input data, and
   a register connected to the input side of said combinational circuit; and
   an asynchronous signal control circuit that controls data transmission to and from each of the registers in said pipelined datapath circuit in response to a request signal;
   wherein said combinational circuit in each of said plurality of data processing stages is composed of a multi-threshold CMOS circuit, with said multi-threshold CMOS circuit further comprising
   a logic circuit portion configured by a low-threshold CMOS circuit, and
   a power control circuit portion, which is configured by a plurality of high-threshold MOS transistors and controls power feeding with respect to said logic circuit portion;
   and wherein said asynchronous signal control circuit comprises
   a plurality of monitoring circuits, each of which delays for a predetermined period of time a write enable signal generated, in response to a request signal, to be applied to the register preceding the current combinational circuit, and issues another request signal with respect to the register succeeding the current combinational circuit, and also finishes said another request signal based on the issue of said another request signal itself; and
   a plurality of signal generating means each for generating an activation signal for controlling the current combinational circuit to put in an active or inactive state in response to a request signal, but irrespective of an issue of the write enable signal with respect to the register preceding the current combinational circuit.

6. A self-timed pipelined datapath system as claimed in claim 5, wherein said asynchronous signal control circuit generates said activation signal with respect to the current combinational circuit from the write enable signal generated, in response to the request signal, to be applied to the register preceding the current combinational circuit and another write enable signal generated, in response to another request signal, to be applied to the register succeeding the combinational circuit.

7. A self-timed pipelined datapath system as claimed in claim 5, wherein said asynchronous signal control circuit comprises a plurality of high-threshold MOS transistors.

8. A self-timed pipelined datapath system as claimed in claim 6, wherein said request signal with respect to the register succeeding the current combinational circuit is arranged to be generated after a signal propagation time within the current combinational circuit has passed from the moment of generation of the write enable signal in response to the request signal with respect to the register preceding the current combinational circuit.

9. A self-timed pipelined datapath system based on a two-phase handshaking protocol comprising:

a pipelined datapath circuit including a plurality of data processing stages, each having a combinational circuit for processing input data, and a register connected to the input side of said combinational circuit, with said register being composed of a double edge-triggered D flip-flop; and an asynchronous signal control circuit that controls data transmission to and from each of the registers in said pipelined datapath circuit in response to a request signal;

wherein said combinational circuit in each of said plurality of data processing stages is composed of a multi-threshold CMOS circuit, with said multi-threshold CMOS circuit further comprising a logic circuit portion configured by a low-threshold CMOS circuit, and a power control circuit portion, which is configured by a plurality of high-threshold MOS transistors and controls power feeding with respect to said logic circuit portion;

and wherein said asynchronous signal control circuit comprises:

a plurality of delay circuits, each of which delays for a predetermined period of time a state change of a write enable signal generated, in response to a request signal, to be applied to the register preceding the current combinational circuit, and generates a state change of another request signal with respect to the register succeeding the current combinational circuit; and a plurality of signal generating means each for issuing an activation signal for controlling the current combinational circuit to put in an active or inactive state, in accordance with the state change of the write enable signal generated in response to the request signal with respect to the register preceding the current combinational circuit, and finishes said activation signal in response to the state change of the write enable signal generated in response to the request signal with respect to the register succeeding the current combinational circuit.

10. A self-timed pipelined datapath system as claimed in claim 9, wherein said request signal with respect to the register succeeding the current combinational circuit is arranged to be generated after a signal propagation time in the current combinational circuit has passed from the moment of generation of the activation signal.

11. A self-timed pipelined datapath system as claimed in claim 9, wherein said asynchronous signal control circuit comprises a plurality of high-threshold MOS transistors.

* * * * *